United States Patent Office 3,525,799
Patented Aug. 25, 1970

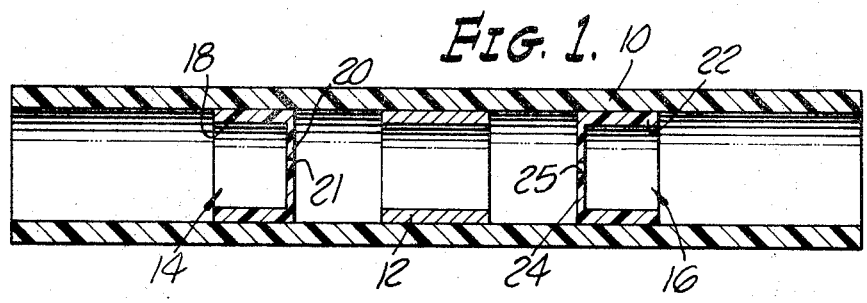
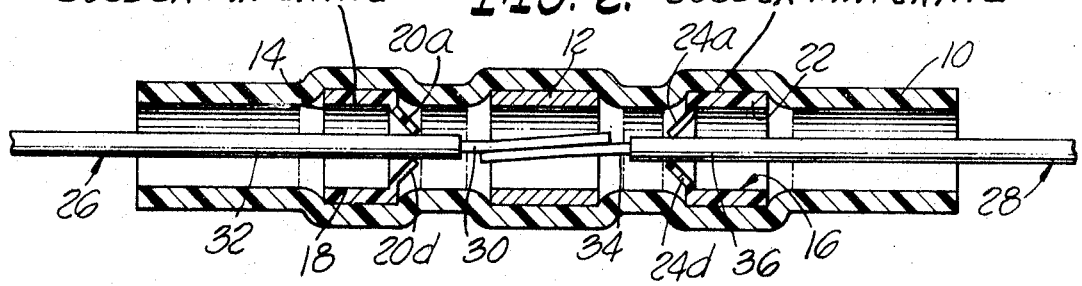
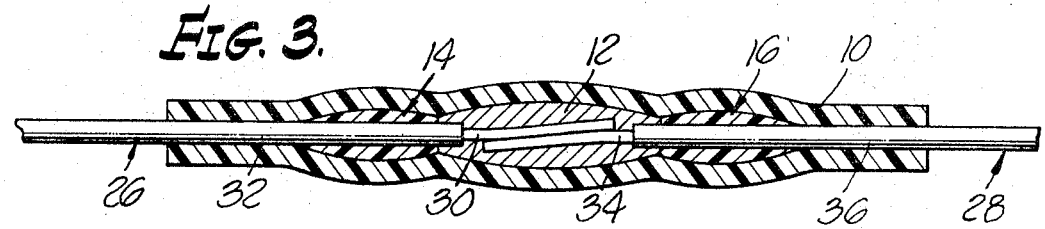
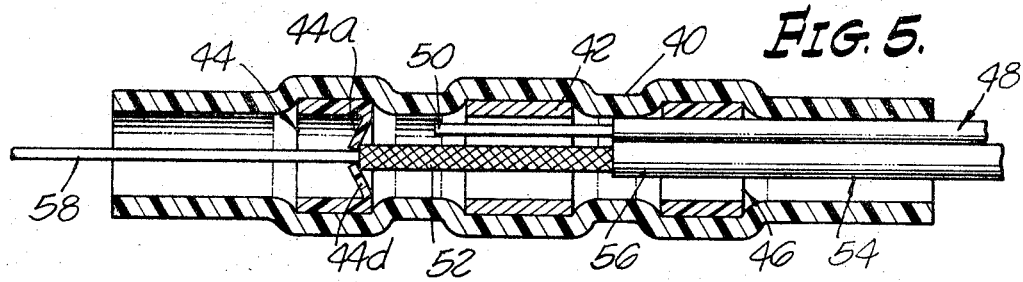
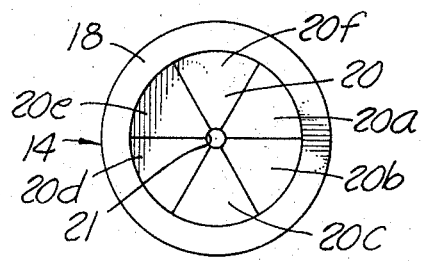

3,525,799
HEAT RECOVERABLE CONNECTOR
Roger H. Ellis, Atherton, Calif., assignor to Raychem Corporation, Menlo Park, Calif., a corporation of California
Filed May 17, 1968, Ser. No. 730,015
Int. Cl. H02g 15/08
U.S. Cl. 174—84       10 Claims

ABSTRACT OF THE DISCLOSURE

A connector formed from a heat shrinkable tubular member containing a fusible insert. The insert is provided with inwardly extending fingers for grasping and locating an object inserted into the tubular member. The heat shrinkable tubular member may additionally contain a solder insert for making a good electrical connection between a pair of wires inserted into the tubular member, or the fusible insert may itself be solder and serve a dual purpose.

---

This invention relates to a connector and more particularly relates to a heat recoverable connector having a fusible insert therein for properly locating an article to be connected or joined.

In Wetmore Pat. No. 3,243,211, several types of novel connectors are disclosed. Electrical connectors according to the Wetmore patent, the disclosure of which is incorporated by reference herein, include a dimensionally heat unstable member such as a sleeve in which is placed a ring or ball-shaped solder insert. In a typical connector of this type, both ends of the member or sleeve are open to receive the electrical conductors that are to be connected. The connector is then heated causing the member or sleeve to shrink and firmly grip the conductors. The heat also causes the solder to flow and form a soldered connection between the two electrical conductors. The sleeve acts to contain the movement of the solder so that a good soldered joint is assured.

In general, such members or sleeves are made of a material capable of having the property of plastic or elastic memory imparted thereto and are expanded under heat and pressure to a diameter greater than their normal diameter and cooled while under pressure. A sleeve treated in this manner will retain its expanded position until it is again heated to above its heat recovery temperature at which time it will recover to its original shape. Examples of material useful in forming such dimensionally heat unstable recoverable members may be found in Currie Pat. No. 2,027,962 and Cook et al. Pat. No. 3,086,242, the disclosures of which are incorporated herein by reference. Polymeric materials which have been cross-linked by chemical means or by irradiation, for example, with high energy electrons or nuclear radiation, such as those disclosed in the Cook, et al. patent, are preferred for use in the present invention. Noncrystalline polymeric materials exhibiting the property of plastic or elastic memory, such as polyurethane, inomers, etc., could also be used in practicing the present invention. The connector of the present invention is equally useful with sleeves made from materials having either plastic or elastic memory; consequently, as used herein, the term "elastic memory" and "plastic memory" are used interchangeably and are intended to be mutually inclusive.

Recoverable members or sleeves of this type are extremely useful in the making of insulated soldered connections between electrical conductors such as between a terminal on a piece of electrical apparatus and a wire, or between two wires. Generally, this is accomplished by providing the recoverable sleeve with an internal ring of solder, passing the electrical conductors into the two ends of the sleeves until the conductive portions of the conductors are located within the solder ring, and heating the assembly so that the sleeve tries to recover to its original shape and the solder melts and joins the two conductors. The result is a good electrical connection which is insulated and protected by the sleeve.

In some instances the forming of an electrical connection between a terminal and a wire or between two wires is time consuming and requires a relatively high level of attention because the terminal and wire may be of various lengths and diameters and the proper positioning of the sleeve with respect to the terminal and conductor must be carefully made. Even after the sleeve has been properly located, it is necessary, in order to get the best possible soldered connections, that the sleeve and the conductors be prevented from relative movement before and during the application of heat sufficient to recover the sleeve and complete the installation. While this is not too difficult when only a single connection is being made, it is considerably more difficult when a plurality of connections are being made simultaneously as is often desired. In such a case, some sort of fixture often is provided for holding the sleeves in position. While such fixtures are satisfactory for many applications, they are generally relatively bulky and not always available when needed.

It is therefore an object of the present invention to provide a connector for joining a plurality of objects.

It is also an object of the present invention to provide a connector for positioning and maintaining in position the objects to be joined prior to their permanent connection.

It is another object of the present invention to provide such a connector utilizing a heat recoverable sleeve having fusible inserts therein for positioning the objects to be connected.

It is a further object of the present invention to provide an electrical connector including a heat recoverable sleeve having a solder insert therein and at least one fusible insert for positioning an electrical conductor prior to recovery of the sleeve and preventing extrusion of the solder from the sleeve upon recovery thereof.

These and other objects and advantages of the present invention will become more apparent upon reference to the accompanying description and drawings in which:

FIG. 1 is a side view in cross section of a first embodiment of an electrical connector according to the present invention prior to the partial recovery of the heat recoverable sleeve;

FIG. 2 is a side view in cross section of the electrical connector of FIG. 1 after partial recovery and after a pair of electrical conductors have been inserted therein;

FIG. 3 is a side view in cross section of the electrical connector of FIG. 1 after it has been completely installed on a pair of electrical conductors;

FIG. 4 is an end view of a fusible insert according to the present invention; and FIG. 5 is a side view in cross section of a second embodiment of an electrical connector according to the present invention after partial recovery of the sleeve and after a pair of electrical conductors have been inserted therein.

Briefly, the present invention is directed to an electrical connector comprising a sleeve of heat recoverable material having at least one fusible insert positioned therein. The fusible insert is designed so that it will hold an electrical conductor or similar object in a desired position within the sleeve. For some applications, the insert may be of a fusible, nonconductive material such as those disclosed in the Wetmore patent or may be made of solder. In either of these cases, the insert performs an additional function: in the case where the insert is nonconductive, it serves as a dam member to prevent the solder from being extruded from the sleeve when the sleeve recovers; and in the case where it is constructed of solder, it melts to form the soldered connection between conductors. The sleeve is partially recovered to hold the insert or inserts in place and the conductors can then be inserted through the insert and held in position thereby. When heat is applied to a sleeve containing a nonconductive insert, this insert melts when the sleeve begins to shrink thereby forming a dam which prevents the solder from flowing out of the sleeve. Continued heating causes the sleeve to continue to shrink and the solder to melt whereby the conductors are bonded together. The insert of the present invention can also be used to position an object where no solder insert is to be used, for example, to insulate a crimp splice.

Turning now to FIGS. 1–4, there is shown a first embodiment of an electrical connector constructed in accordance with the present invention. As shown in FIG. 1, a dimensionally heat unstable tubular member or sleeve 10 has a solder insert 12 positioned therein, the insert taking the form of a ring of solder. The insert 12 preferably comprises both solder and a suitable flux. The material from which the sleeve is formed preferably has a crystalline melting temperature or recovery temperature below that of the fusing temperature of the solder insert. When an insert such as solder is used that is rigid during at least a portion of the recovery of the sleeve, it has been found that unexpectedly superior results are obtained when a sleeving material is used that exhibits elastomeric properties when heated to at least its crystalline melting temperature. Such a material has a wide range of useful recovery temperatures and thus permits the utilization of a single sleeving material with a wide range of solder compositions.

Positioned within the sleeve 10 on either side of the solder insert 12 are fusible inserts 14 and 16. As shown in FIG. 4, the fusible insert 14 is injection molded or otherwise fabricated in the form of a cup having a tubular side wall 18 and a flat bottom wall 20. The bottom wall 20 is preferably thinner than the side wall 18 and is provided with slots which divide it into a plurality of centrally directed flaps or fingers 20a, 20b, 20c, 20d, and 20e, and 20f. The bottom wall 20a, 20b, 20c, 20e, and 20f. The bottom wall 20 is also preferably provided with a centrally located guide hole 21. The fusible insert 16 is identical to the insert 14 and has a tubular wall 24 divided into fingers 24a–26f (only 24a and 24d being shown, and a guide hole 25.

The fusible inserts 14 and 16 may comprise virtually any material capable of being rendered flowable by the application of heat. For example, conventional thermoplastic materials such as polyolefins (polyethylene, polypropylene, etc.), polyamides (e.g., nylon), polyesters (e.g., polyethylene terephthalate, cellulose acetate), and other similar materials. It is, however, to be understood that these inserts are not limited to the use of conventional thermoplastics.

After the solder insert 12 and the fusible inserts 14 and 16 are positioned within the sleeve 10 is partially recovered around the inserts to hold them in place. The configuration of the assembly after this partial recovery is shown in FIG. 2. FIG. 2 also illustrates the manner in which pair of wires 26 and 28 are positioned in the sleeve 10. As the wire 26 is inserted into the left hand end of the sleeve 10, the conductive portion 30 of the wire 26 passes through the guide hole 21 in the bottom wall 20 of the insert 14. As the wire 26 is inserted further into the insert 14, the insulation 32 engages the fingers 20a–20f, causing them to flex and firmly grip the insulation 32 of the wire 26. If the insert 14 is properly positioned in the sleeve 10 and if the exposed conductive portion 30 of the wire 26 is of a proper length, the conductive portion 30 will be located within the solder insert 12 when the insulation 32 is initially gripped by the fingers 20a–20f. The wire 28 is similarly inserted in the right hand side of the member 10 until its conductive portion 34 is within the solder insert 12 and its insulation is grasped by the fingers 24a–24f. As can be seen, both of the wires 26 and 28 are now held firmly in place and properly positioned and will hold this proper position until the recovery of the sleeve is completed.

Complete recovery of the sleeve is shown in FIG. 3. Upon heating of the assembly to above the recovery temperature of the material of sleeve 10 and the melting points of the fusible inserts 14 and 16 and the solder insert 12, the sleeve 10 shrinks tightly around the insulation 32 and 36 of the wires 26 and 28. As the heating continues, the fusible inserts 14 and 16 are caused to flow and form a dam on either side of the solder insert 12. As soon as the inserts 14 and 16 flow, the portions of the sleeve 10 in their immediate area are permitted to recover and press the material of the fusible inserts tightly against the wires 26 and 28. As the heating continues further, the flux in the solder insert 12 flows to prepare the surfaces of the conductive portions 30 and 34 of the wires 26 and 28 and the solder melts to form the joint. The sleeve 10 continues to shrink, pressing the molten solder around the conductive portions 30 and 34 while at the same time, in cooperation with the melted inserts 14 and 16, controlling the flow of the solder. Upon cooling, the solder solidifies and the sleeve cools to form an insulated soldered connection.

Turning now to FIG. 5, there is shown another embodiment of an electrical connector according to the present invention. In this embodiment, a sleeve 40 similar to the sleeve 10 is provided with a solder insert 42 similar to the insert 12 and a fusible insert 44 similar to the fusible insert 14. The sleeve 10 is also provided with a fusible insert 46 which may be constructed of the same material as the insert 44 but which is not provided with a bottom wall or fingers such as the fingers 44a–44f. As shown in this embodiment, the objects to be connected are a ground wire 48 having a conductive portion 50 and the shielding 52 of a shielded wire 54 having insulation layers 56 and 58 on either side of the shielding 52.

As can be seen, the shielded wire 54 is inserted into the sleeve 10 until the insulation layer 58 passes through the guide hole of the fusible insert 44. Preferably, the guide hole is made sufficiently smaller in diameter than the insulation layer 58 so that the fingers 44a–44f are caused to flare inward in the manner shown and grip the insulation layer 58. Insertion of the wire 54 is continued until the end of the shielding 52 engages the fingers 44a–44f. This will position the shielding 52 in the proper location relative to the solder insert 42. The ground wire 48 is then inserted and the sleeve 40 recovered. As was the case in the previous embodiment, the application of heat will cause the fusible inserts 44 and 46 to melt forming dams on either side of the solder insert 42, and will cause the solder insert 42 to melt and form a good soldered connection between the conductive portion 50 of ground wire 48 and the shielding 52 of wire 54.

Of course, if desired, the guide hole of the fusible inserts 14 and 16 of the embodiment of FIGS. 1–3 can be dimensioned relative to the dimensions of the wires 26 and 28 so that the fingers of each insert will firmly grasp the conductive portion of the respective wire. In such an event, a wire would be inserted into the sleeve only until the insulation of the wire engages the fingers rather than to the point shown in FIG. 2 where the fingers grasp the insulation. In many cases, this arrangement would be desirable as the positioning of the conductive portions of the wires relative to the solder insert can be made more accurate.

If desired, for example, in a situation where dam members are not required, the solder insert itself can be provided with fingers for grasping the wire. As was the case with the other fusible inserts illustrated, a solder insert is formed in the shape of a cup having a tubular wall and a bottom wall. The bottom wall is slit to divide it into a plurality of flaps or fingers and provided with a guide hole. The flaps or fingers are made thin enough so that when a wire is passed through the guide hole, the fingers will flex and will firmly grasp it. The wire is preferably inserted from the bottom of such a cup so that the conductive portion is within the tubular wall of the insert and the insulation on the wire engages the fingers.

It should be understood that while the invention has been described in connection with an electrical connector, it can also readily be used for connecting other similarly shaped objects. It should also be understood that while only one wire is shown inserted into each fusible insert, it is possible to insert more than one wire through an insert, in which case both wires are held in position. Such would be desirable, for example, when the recoverable sleeve is in the form of a cap provided with a solder insert and it is desired to make a soldered connection between the ends of two wires inserted into the cap.

The invention may be embodied in other specific forms not departing from the spirit or central characteristics thereof. The present embodiments are therefore to be considered in all respects as illustrative and not restrictive.

I claim:

1. A connector comprising a dimensionally heat unstable tubular member and fusible insert positioned therein, said fusible insert having a plurality of centrally directed fingers for grasping an object positioned within said tubular member and further being meltable at a temperature used to recover said tubular member.

2. The connector of claim 1 wherein said insert comprises a tubular wall and a plurality of centrally directed fingers depending from said tubular wall.

3. The connector of claim 2 wherein said fusible insert comprises thermoplastic polymeric material.

4. The connector of claim 2 wherein said fusible insert comprises solder, said solder being fusible at a temperature used to recover said tubular member.

5. The connector of claim 3 wherein a solder insert is positioned within said tubular member and spaced from said thermoplastic fusible insert.

6. A connector comprising a hollow, independently dimensionally heat unstable member having an interior chamber formed by a wall comprising a material having the property of elastic memory when heated to at least its recovery temperature, a fusible insert positioned within said chamber and firmly engaging said wall thereof, said fusible insert comprising a tubular wall having a plurality of centrally directed fingers depending therefrom for engaging an object inserted into said heat unstable member, and a solder insert position within said heat unstable member and firmly engaging said wall thereof, said solder insert being spaced from said fusible insert.

7. The connector of claim 6 wherein a second fusible insert is positioned within said heat unstable member on the other side of said solder insert.

8. The connector of claim 7 wherein said second fusible insert comprises a tubular wall having a plurality of centrally directed fingers depending therefrom.

9. The connector of claim 8 wherein each of said fusible inserts comprises thermoplastic polymeric material.

10. An electrical connector comprising a hollow, dimensionally heat unstable tubular member capable of assuming a heat unstable condition and predetermined dimension upon the application of heat alone and exhibiting elastomeric properties at at least its crystalline melting temperature and having an interior chamber defined by the wall thereof, a fusible insert positioned within said chamber and firmly engaging said wall, said fusible insert comprising a tubular wall having a plurality of centrally directed fingers depending therefrom of thermoplastic polymeric material for engaging an object inserted into said heat unstable member, and a solder insert positioned within said heat unstable member, said solder insert being spaced from said fusible insert and firmly engaging said wall.

References Cited

UNITED STATES PATENTS

| | | | |
|---|---|---|---|
| 3,288,914 | 11/1966 | Fuller et al. | 174—84 |
| 3,312,772 | 4/1967 | Sherlock. | |
| 3,320,355 | 5/1967 | Booker | 174—84 |
| 3,387,364 | 6/1968 | Boggs | 174—84 XR |
| 3,019,284 | 1/1962 | Matthysse | 174—90 XR |
| 3,331,914 | 7/1967 | Kavinsky | 174—65.1 |

DARRELL L. CLAY, Primary Examiner

U.S. Cl. X.R.

19—628; 174—94; 228—56; 339—275